US009475392B2

United States Patent
Klamser et al.

(10) Patent No.: US 9,475,392 B2
(45) Date of Patent: Oct. 25, 2016

(54) BODY ARRANGEMENT WITH A PROTECTIVE ARRANGEMENT FOR SAFETY-RELEVANT PARTS IN THE AUTOMOTIVE FIELD

(71) Applicant: Dr. Ing. h.c. F. Porsche Aktiengesellschaft, Stuttgart (DE)

(72) Inventors: Herbert Klamser, Korntal-Muenchingen (DE); Daniel Haag, Stuttgart (DE)

(73) Assignee: DR. ING H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/306,869

(22) Filed: Jun. 17, 2014

(65) Prior Publication Data

US 2015/0360631 A1    Dec. 17, 2015

(30) Foreign Application Priority Data

Jun. 18, 2013    (DE) .................... 10 2013 106 297

(51) Int. Cl.
*B60R 16/04*    (2006.01)
*B60L 3/00*    (2006.01)
*B60R 19/34*    (2006.01)
(Continued)

(52) U.S. Cl.
CPC ............. *B60L 3/0007* (2013.01); *B60K 1/04* (2013.01); *B60K 15/07* (2013.01); *B60R 19/34* (2013.01); *B60K 2001/0411* (2013.01); *B60K 2015/0637* (2013.01); *B60Y 2306/01* (2013.01)

(58) Field of Classification Search
CPC ...................... B60R 19/34; B60R 2019/1806
See application file for complete search history.

(56) References Cited

U.S. PATENT DOCUMENTS 6,007,123 A    12/1999 Schwartz et al.
2005/0173170 A1*    8/2005 Miyajima et al. ........... 180/68.5
(Continued)

FOREIGN PATENT DOCUMENTS

DE    1020008027894    12/2009
DE    102010018729    11/2011
(Continued)

OTHER PUBLICATIONS

Meier et al., Crash energy absorbing arrangement for use in motor vehicle, has galvanic cell, deformation elements and subframe that are designed such that twist of galvanic cell counter-acting load path is formed during crash, Dec. 17, 2009, Germany, DE 10 2008 027 894 A1, Machine Transition of Description.*
(Continued)

*Primary Examiner* — James English
(74) *Attorney, Agent, or Firm* — Gerald E. Hespos; Michael J. Porco; Matthew T. Hespos

(57) ABSTRACT

A protective arrangement for safety-relevant parts of a motor vehicle that are arranged in a supporting structure. The protective arrangement is provided between the safety-relevant part and the closest bumper. The protective arrangement has at least one protective element that is arched in the longitudinal direction of the motor vehicle toward the outside of the motor vehicle. The protective element is mounted directly or indirectly on the supporting structure via bearings that are configured such that a bearing action acts only in the longitudinal direction of the motor vehicle.

11 Claims, 2 Drawing Sheets

(51) Int. Cl.
   *B60K 15/07*   (2006.01)
   *B60K 1/04*   (2006.01)
   *B60K 15/063*   (2006.01)

(56) References Cited

U.S. PATENT DOCUMENTS

2008/0190679 A1\* 8/2008 Sato et al. ............... 180/68.5
2008/0283317 A1   11/2008 Wagner et al.
2009/0145676 A1\* 6/2009 Takasaki et al. ........... 180/65.1

FOREIGN PATENT DOCUMENTS

| EP | 2353971 | 8/2011 |
|---|---|---|
| JP | S48-5420 | 1/1973 |
| JP | S485420 U | 1/1973 |
| JP | 2008285150 | 11/2008 |
| JP | 2010195134 | 9/2010 |
| JP | 2010195134 A | 9/2010 |

OTHER PUBLICATIONS

Brandt et al., Additional structure for collapsible zone of body of passenger car, is arranged in receiving space of structural elements of body of passenger car, and carrier plane, which is supported at front wall cross beam of passenger compartment, Nov. 3, 2011, Germany, DE 10 2010 018 729 A1, Machine Transition of Description.\*

German Search Report of Feb. 13, 2014.

Chinese Office Action Dated December 30, 2015.

\* cited by examiner

BODY ARRANGEMENT WITH A PROTECTIVE ARRANGEMENT FOR SAFETY-RELEVANT PARTS IN THE AUTOMOTIVE FIELD

CROSS REFERENCE TO RELATED APPLICATION

This application claims priority under 35 USC 119 to German Patent Appl. No. 10 2013 106 297.0 filed on Jun. 18, 2013, the entire disclosure of which is incorporated herein by reference.

BACKGROUND

1. Field of the Invention

The invention relates to a body arrangement for protecting at least one safety-relevant part in the automotive field, such as high-voltage batteries, tanks or pressure vessels. The at least one safety-relevant part is arranged in a supporting structure that has bumpers arranged in the longitudinal direction. The protective arrangement is between the safety-relevant part and the closest bumper. The protective arrangement has at least one protective element that is arched in the longitudinal direction of the motor vehicle toward the outside of the motor vehicle. The protective element is mounted directly or indirectly on the supporting structure via bearings.

2. Description of the Related Art

EP 2 353 971 describes a body arrangement of a motor vehicle with longitudinal beams and a protective arrangement. The protective arrangement includes a protective element that is between a bumper and an energy store. The protective element is arched toward a bumper of the motor vehicle and is fixed in the longitudinal and transverse directions of the motor vehicle. The protective arrangement can be folded up about a defined tilting axis in the event of a collision, and in this way absorbs a major part of the energy imparted by the collision. The protective arrangement finally comes to bear against the top side of the energy store. This protective arrangement functions only if a collision acts centrally and is oriented in the longitudinal direction of the motor vehicle to ensure the folding-up process occurs about the predefined axis in the desired manner. A laterally offset collision or a collision that does not take place in the longitudinal direction of the motor vehicle will inevitably lead to an undefined folding process, and these latter types of collisions occur more commonly in reality than a straight, centrally oriented collision.

It is therefore an object of the invention to provide a body arrangement that protects safety-relevant parts in the most commonly occurring collision situations.

SUMMARY OF THE INVENTION

The invention relates to a protective element for a safety relevant part of a motor vehicle with bearings configured so that a bearing action acts only in the longitudinal direction of the motor vehicle. In this way, the forces acting in the longitudinal direction of the motor vehicle in the event of a collision are converted into shear forces oriented in, the transverse direction of the motor vehicle. The body arrangement has a simple construction and design with corresponding advantages in relation to the prior art.

The bearing may comprise a bracket that is connected to supporting structure.

The safety-relevant part advantageously is arranged in a housing. The housing advantageously has collision profiles running at least in the longitudinal direction of the motor vehicle to ensure greater rigidity upon contact with the protective arrangement in the event of a collision. More particularly high rigidity is realized by providing the housing with a frame that has longitudinal and transverse beams connected to one another rigidly in terms of shear. In this embodiment, the bearing may be a guide on the housing.

The protective element may be an extruded profile that may be formed of aluminum. However, the protective element also may be formed from reinforced plastic or may be a sheet-steel construction.

A high-strength material may be integrated into parts of the protective element to prevent a penetration of aggressive, sharp components in the event of a particularly severe collision.

The protective element may have support elements directed toward the safety-relevant part to provide certain defined contact points with the housing of the safety-relevant part.

The invention will be explained in more detail below on the basis of the drawings.

DETAILED DESCRIPTION OF THE PREFERRED EMBODIMENTS

Figure 1:
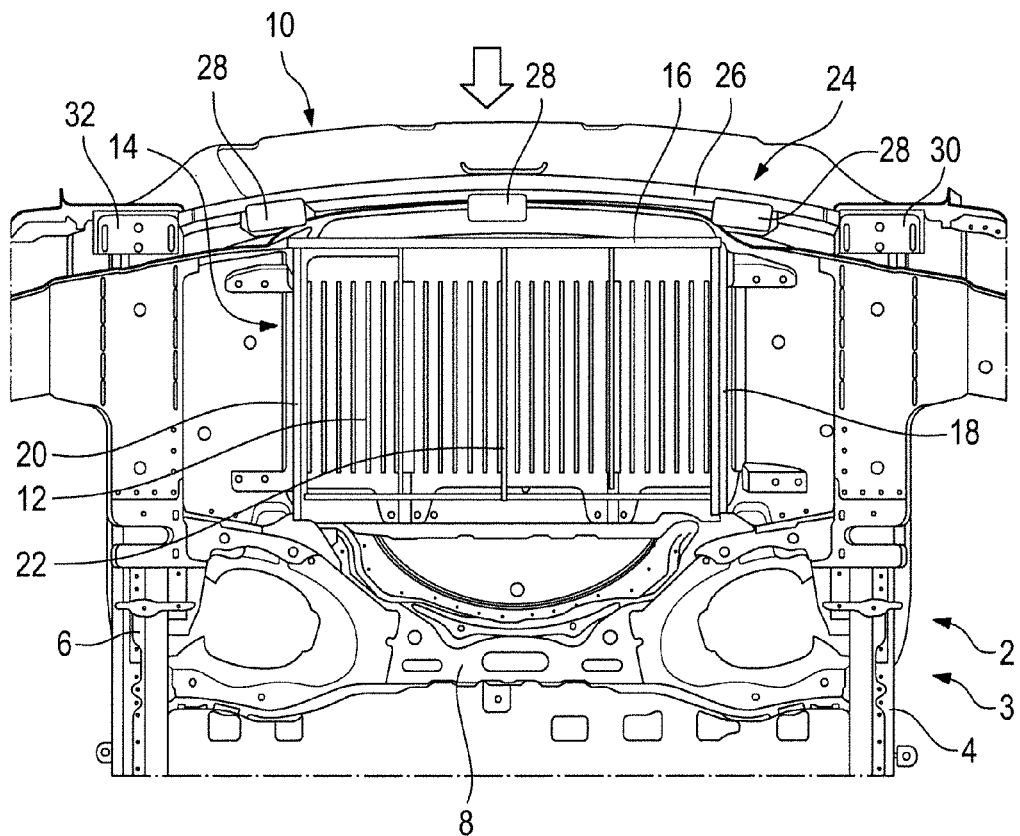
FIG. 1 is a plan view of a part of a body arrangement of a first embodiment.

FIG. 1 is a plan view of a body arrangement 2 having a supporting structure 3 and intended for a motor vehicle (not illustrated in any more detail). The supporting structure 3 is illustrated schematically and has two longitudinal beams 4, 6 and a transverse beam 8. A bumper 10 is on the supporting structure 3. The view illustrated here also shows a rear-end region of the motor vehicle. A safety-relevant part is arranged between the transverse beam 8 and the bumper 10, and in this case is a high-voltage battery 12. The high-voltage battery 12 is provided in a housing 14 that has a housing transverse beam 16 and two housing longitudinal beams 18, 20. Furthermore, a collision profile 22 runs in the longitudinal direction. It should be noted that the housing transverse beams and longitudinal beams 16, 18, 20 may also be in the form of collision profiles.

A protective arrangement 24 is provided between the bumper 10 and the high-voltage battery 12. The protective arrangement 24 has a protective element 26 that is arched in the direction of the bumper 10 and, in the present case, is in the form of an extruded aluminum profile. The extruded aluminum profile may also have parts composed of high-strength material to prevent an ingress or penetration of sharp objects. The protective element 26 has supports 28 on its side directed toward the high-voltage battery 12. The protective element 26 is mounted, at the sides, in brackets 30, 32 that are connected operatively to the longitudinal beams 4, 6. As can be seen from FIG. 2, the brackets 30, 32 are arranged on the longitudinal beams 4, 6, and form bearings for the protective element 26, so that a bearing action of the protective element 26 acts only in the longitudinal direction of the motor vehicle.

Figure 2:
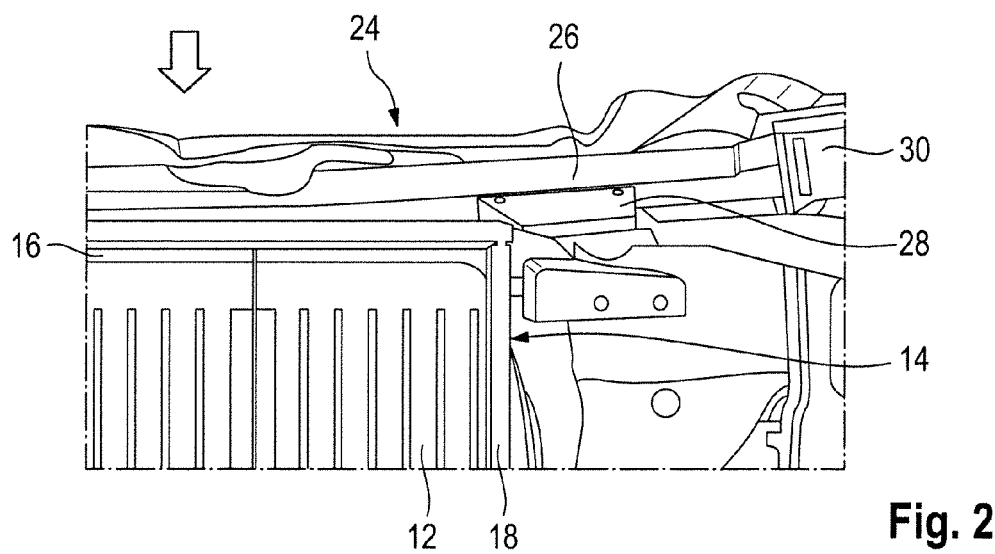
FIG. 2 is a detail view of the body arrangement from FIG. 1 after a collision.

FIG. 2 shows a detail view of the body arrangement 2 of FIG. 1 after another vehicle has collided with the rear-end region of the motor vehicle and shows the displacement of the bracket 30 in the transverse direction of the motor vehicle. The mobility of the protective element 26 in the transverse direction causes the forces acting in the longitudinal direction to be absorbed and converted into shear forces running in the transverse direction. The collision caused the support element 28 to bear against the housing 14 of the high-voltage battery 12 and to deform plastically. The central region of the protective element 26 also bears against the housing 14. However, the protective arrangement 24 of the invention prevents further deformation of the housing 14, and thus prevents damage to the high-voltage battery 12.

Figure 3:
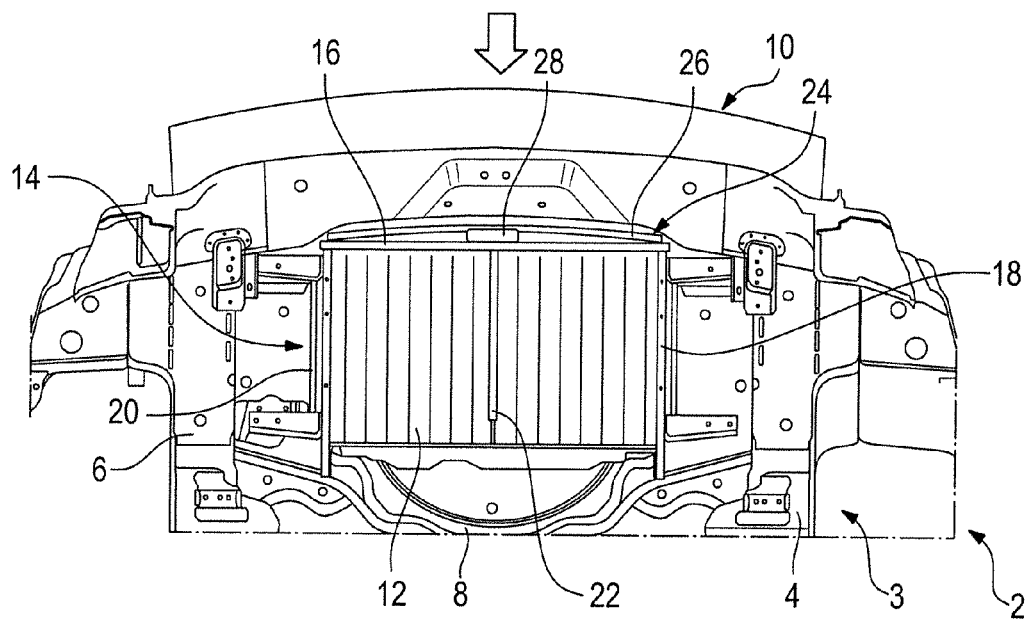
FIG. 3 is a plan view of a body arrangement of a second embodiment.

FIG. 3 shows a second embodiment according of the body arrangement 2 of the invention. In terms of basic construction, the body arrangement 2 illustrated here corresponds to the body arrangement 2 of FIG. 1. Accordingly, only the differences of this embodiment will be discussed below. A high-voltage battery 12 again is provided in a housing 14, as safety-relevant part. The housing 14 has a housing transverse beam 16 and two housing longitudinal beams 18, 20 that are connected to one another rigidly in terms of shear. Furthermore, a protective arrangement 24 is provided and is constructed substantially from a protective element 26, which is arched toward the bumper 10, and a support element 28. In this exemplary embodiment, however, the protective arrangement 24 is not connected to the supporting structure 3 of the body arrangement 2, but rather is mounted in positively locking fashion, for example by a sliding guide (not illustrated in any more detail), on the housing 14. For assembly reasons, an adhesive connection may be provided between the protective arrangement 24 and the housing 14. The adhesive connection however does not restrict the freedom of movement of the protective element 26 in the transverse direction of the motor vehicle.

Figure 4:
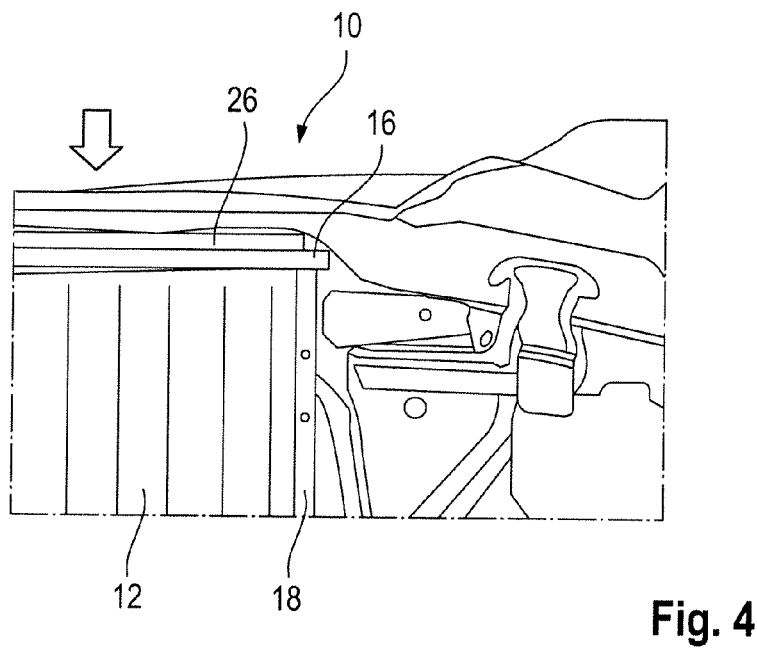
FIG. 4 is a detail view of the body arrangement from FIG. 3 after a collision.

FIG. 4 now shows the body arrangement 2 from FIG. 3 after a collision against the bumper arrangement 10 and shows how the protective element 26 has deflected in the transverse direction of the motor vehicle, because it was possible for the forces acting in the longitudinal direction to be converted into shear forces acting in the transverse direction.

What is claimed is:

1. A protective arrangement for at least one safety-relevant part of a motor vehicle arranged in proximity to a bumper of the motor vehicle, the protective arrangement comprising:

a supporting structure for supporting the at least one safety-relevant part, the supporting structure having first and second spaced-apart longitudinal beams extending in a longitudinal direction and a transverse beam extending between the first and second spaced apart longitudinal beams;

first and second bearings mounted on corresponding positions of the first and second longitudinal beams; and at least one protective element extending between the first and second spaced-apart longitudinal beams, the at least one protective element arched in a longitudinal direction of the motor vehicle toward the bumper, the protective element having first and second ends mounted to the first and second bearings, wherein the first and second bearings are configured so that a bearing action of the protective element acts only in the longitudinal direction of the motor vehicle, and the first and second bearings are displaceable in a direction transverse to the longitudinal direction of the motor vehicle so that impact forces acting in the longitudinal direction are absorbed and converted into shear forces running in the direction transverse to the longitudinal direction.

2. The protective arrangement of claim 1, wherein each of the bearings comprises a bracket that is connected to the supporting structure.

3. The protective arrangement of claim 2, wherein the safety-relevant part is arranged in a housing.

4. The protective arrangement of claim 3, wherein the housing has collision profiles running at least in the longitudinal direction of the motor vehicle.

5. The protective arrangement of claim 4, wherein the housing has a frame with housing longitudinal beams and housing transverse beams that are connected to one another rigidly in terms of shear.

6. The protective arrangement of claim 5, wherein each of the bearings is a guide element provided on the housing.

7. The protective arrangement of claim 1, wherein the protective element is an extruded profile.

8. The protective arrangement of claim 1, wherein the protective element is integrated with a high-strength material.

9. The protective arrangement of claim 1, wherein the protective element has support elements directed toward the safety-relevant part.

10. The protective arrangement of claim 1, wherein the safety-relevant part is a high voltage battery.

11. The protective arrangement of claim 1, wherein the safety-relevant part is a tank or a pressure vessel.

* * * * *